(12) United States Patent
Ferguson et al.

(10) Patent No.: US 9,533,754 B2
(45) Date of Patent: Jan. 3, 2017

(54) WING AERIAL REFUELING SYSTEM

(71) Applicant: The Boeing Company, Chicago, IL (US)

(72) Inventors: Stanley D. Ferguson, Renton, WA (US); Ian J. Fialho, League City, TX (US); Richard C. Potter, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 14/256,935

(22) Filed: Apr. 19, 2014

(65) Prior Publication Data

US 2016/0144950 A1    May 26, 2016

(51) Int. Cl.
| | | |
|---|---|---|
| *B64D 39/00* | (2006.01) | |
| *B64C 9/00* | (2006.01) | |
| *B64C 23/00* | (2006.01) | |

(52) U.S. Cl.
CPC ............... *B64C 23/005* (2013.01); *B64C 9/00* (2013.01); *B64C 23/00* (2013.01); *B64D 39/00* (2013.01)

(58) Field of Classification Search
CPC ............. B64D 39/00; B64C 5/12; B64C 5/10; B64C 7/02; B64C 9/36; B64C 9/34; B64C 23/06; B64C 9/00
See application file for complete search history.

(56) References Cited

U.S. PATENT DOCUMENTS

| | | | |
|---|---|---|---|
| 2,584,663 A | 2/1952 | Bensen | |
| 3,460,628 A | 8/1969 | Tankersley | |
| 3,744,745 A | 7/1973 | Kerker et al. | |
| 4,540,143 A * | 9/1985 | Wang | B64C 23/06 244/130 |
| 4,966,338 A * | 10/1990 | Gordon | B64C 23/06 244/130 |
| 5,284,419 A | 2/1994 | Lutz | |
| 5,779,191 A * | 7/1998 | Brislawn | B64C 5/02 244/194 |
| 6,024,325 A | 2/2000 | Carter, Jr. | |
| 6,065,934 A | 5/2000 | Jacot et al. | |
| 6,135,713 A | 10/2000 | Domzalski et al. | |
| 6,307,301 B1 | 10/2001 | Ngo et al. | |

(Continued)

FOREIGN PATENT DOCUMENTS

| | | |
|---|---|---|
| EP | 2402251 A2 | 1/2012 |
| EP | 2423109 A1 | 2/2012 |

(Continued)

OTHER PUBLICATIONS

European Patent Office, "Extended European Search Report," issued in connection with Application No. 15163131.4, on Sep. 10, 2015, 8 pages.

(Continued)

*Primary Examiner* — Tien Dinh
*Assistant Examiner* — Richard R Green
(74) *Attorney, Agent, or Firm* — Hanley, Flight & Zimmerman, LLC

(57) ABSTRACT

An aircraft comprises a wing assembly, a pod, and a pylon attaching the pod to the wing assembly. The pylon has a swept pylon flap, which is configured to unload the pylon and pod during flight of the aircraft, and also to create downward flow that counters a vortex trailing the pod.

26 Claims, 6 Drawing Sheets

(56) References Cited

U.S. PATENT DOCUMENTS

| | | |
|---|---|---|
| 6,471,477 B2 | 10/2002 | Hassan et al. |
| 6,499,952 B1 | 12/2002 | Jacot et al. |
| 6,543,719 B1 | 4/2003 | Hassan et al. |
| 6,671,590 B1 | 12/2003 | Betzina et al. |
| 7,740,206 B2 | 6/2010 | Eaton et al. |
| 7,798,443 B2 | 9/2010 | Hamilton et al. |
| 7,802,752 B2 * | 9/2010 | Papamoschou ......... F02K 1/383 244/54 |
| 7,980,516 B2 | 7/2011 | Birchette |
| 8,336,813 B2 * | 12/2012 | Bonnaud .................. B64C 7/02 244/53 R |
| 8,453,974 B1 | 6/2013 | Thumann |
| 8,651,426 B2 * | 2/2014 | Morvant ................. B64C 23/06 244/199.1 |
| 8,857,761 B2 * | 10/2014 | Shah ........................ B64C 9/36 244/54 |
| 2008/0131280 A1 | 6/2008 | Krauss et al. |
| 2010/0051744 A1 | 3/2010 | Bonnaud et al. |
| 2011/0248116 A1 * | 10/2011 | Diochon ................ B64D 29/04 244/54 |
| 2012/0104161 A1 | 5/2012 | Shah |
| 2012/0153073 A1 | 6/2012 | Groen |
| 2012/0193478 A1 | 8/2012 | Hrncir |
| 2014/0154074 A1 | 6/2014 | Zientek et al. |

FOREIGN PATENT DOCUMENTS

| | | |
|---|---|---|
| GB | 2464678 A | 4/2010 |
| WO | 2013064768 A2 | 5/2013 |

OTHER PUBLICATIONS

European Patent Office, "Extended European Search Report," issued in connection with Application No. 13195881.1, on Apr. 8, 2014, 2 pages.

United States Patent and Trademark Office, "Non-Final office action", issued in connection with U.S. Appl. No. 13/705,780, mailed on Dec. 18, 2015, 14 pages.

* cited by examiner

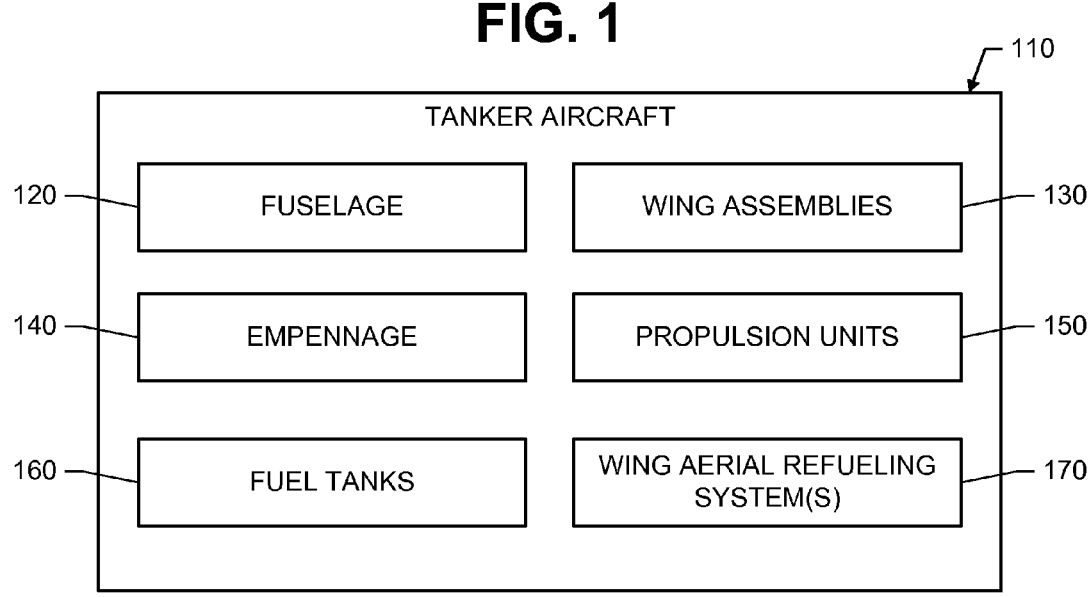
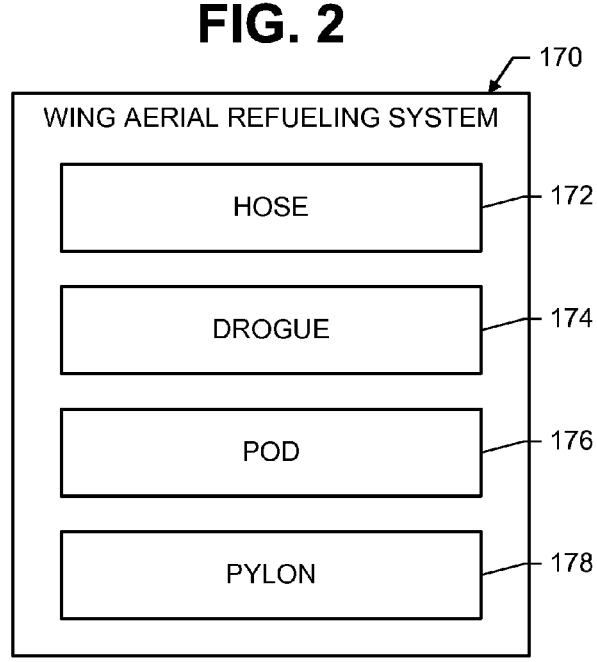

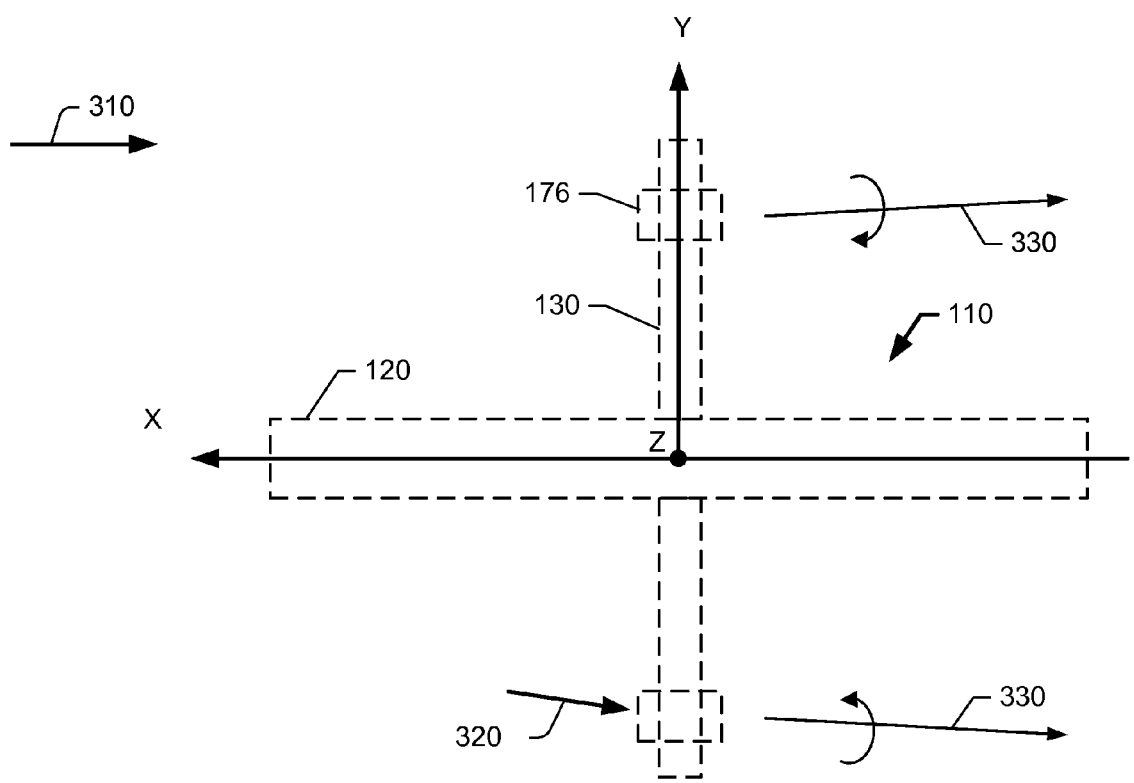

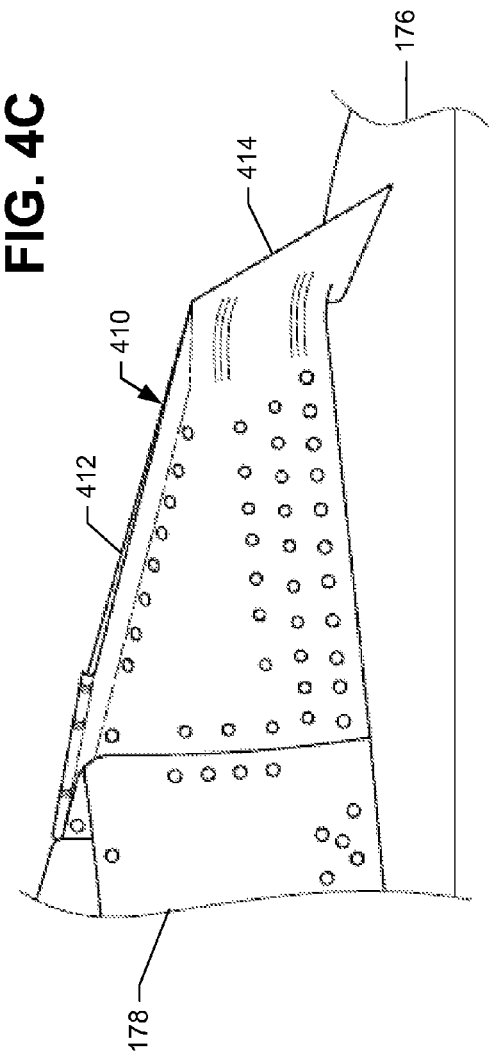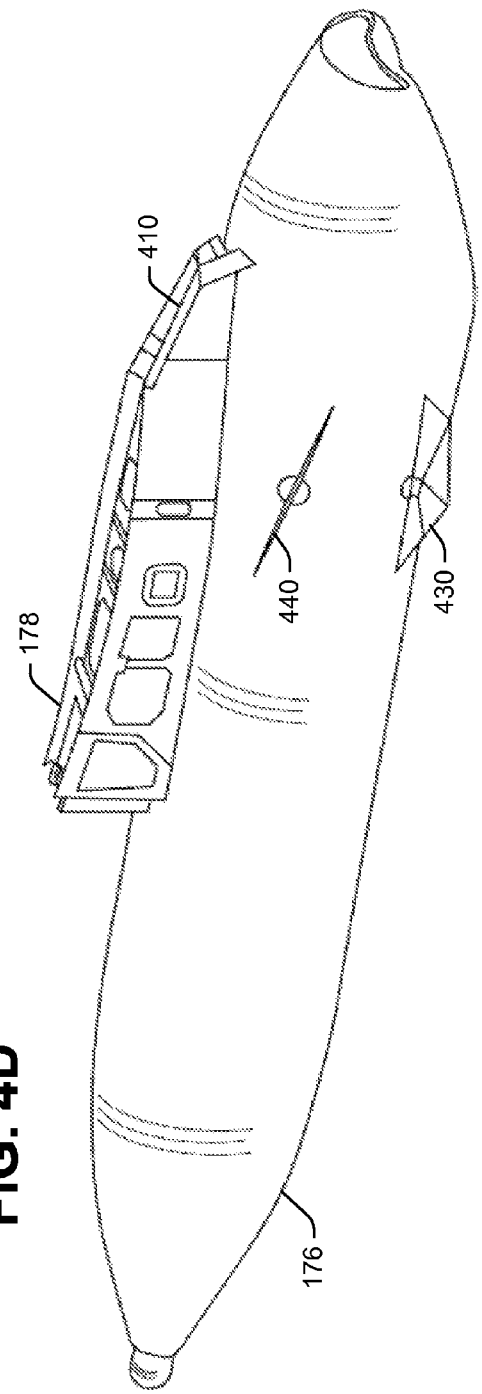

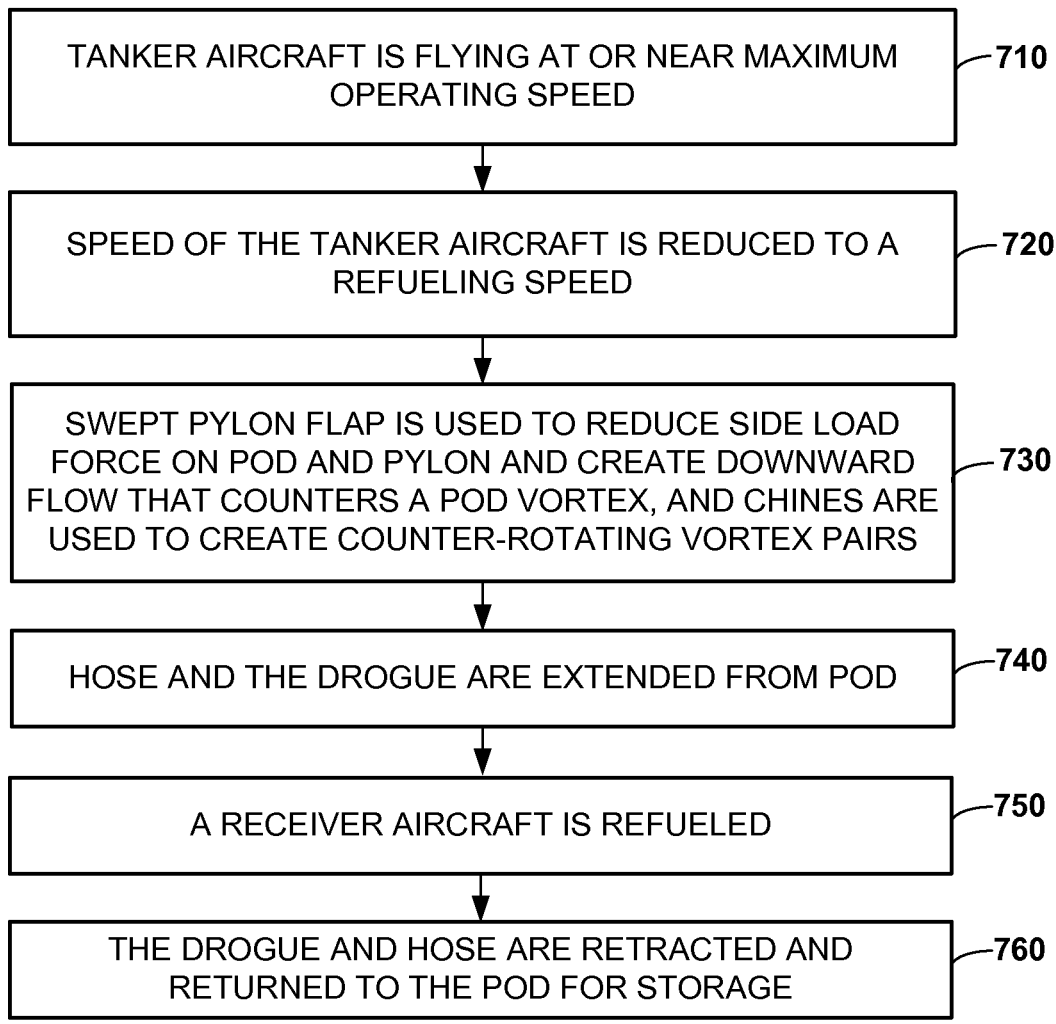

WING AERIAL REFUELING SYSTEM

This invention was made with Government support under contract number FA8625-11-C-6600 awarded by the U.S. Air Force. The government has certain rights in this invention.

BACKGROUND

Aerial refueling systems aboard tanker aircraft are used to transfer fuel to receiver aircraft during flight. One type of aerial refueling system includes a hose and drogue. To perform refueling with this type of system, the tanker aircraft slows down from cruise speed to a lower refueling speed, and extends the hose and drogue. The drogue stabilizes the hose in flight and provides a funnel to aid insertion of the receiver aircraft's probe into a hose fuel coupling.

The hose and drogue are typically stored in a pod that is attached by a pylon to a lower outboard section of the tanker aircraft's wing. When deployed, the hose and drogue trail the pod.

During flight, airflow creates vortices trailing the pod. Vortex flow is circular in a vertical plane and has an upward velocity component which can lift the hose and drogue, thereby causing instability for the hose and drogue during extension and retraction. For older tanker aircraft, existing aerodynamic mitigation designs (e.g., chines and Gurney flaps) can counter low strength vortices across narrow regions of the refueling envelope.

A new class of tanker aircraft is being designed to operate at higher maximum speeds. The pod and its pylon may be designed to minimize buffet at maximum operating speed, but minimizing the buffet will cause higher side loads, which result in stronger vortices at refueling speeds. The existing mitigation designs are not effective for addressing significantly higher vortex strengths across the entire flight envelope.

SUMMARY

According to an embodiment herein, an aircraft comprises a wing assembly, a pod, and a pylon attaching the pod to the wing assembly. The pylon has a swept pylon flap. The swept pylon flap is configured to unload the pylon and pod during flight of the aircraft, and also to create downward flow that counters a vortex trailing the pod.

According to another embodiment herein, a wing aerial refueling system comprises a pod for storing a hose and drogue, and a pylon extending from the pod. The pylon has an outboard swept pylon flap. An uppermost portion of the flap has a shallow angle with respect to local flow. The angle increases towards a lowermost portion of the flap.

According to another embodiment herein, a wing aerial refueling system comprises a pod configured to store a hose and drogue, and first and second chines on an outer surface of the pod for creating a counter-rotating vortex pair.

According to another embodiment herein, a method of using a hose and drogue in a pod aboard a tanker aircraft comprises flying the tanker aircraft at a refueling speed, extending the hose and the drogue to trail the pod, and using a swept flap and chines to disrupt a pod vortex trailing the pod and induce a downward flow that counters the pod vortex.

These features and functions may be achieved independently in various embodiments or may be combined in other embodiments. Further details of the embodiments can be seen with reference to the following description and drawings.

BRIEF DESCRIPTION OF THE DRAWINGS

FIG. 1 is an illustration of a tanker aircraft.

FIG. 2 is an illustration of a wing aerial refueling system for the tanker aircraft.

FIG. 3 is an illustration of a coordinate system for the tanker aircraft, and directions of air flow during flight.

FIGS. 4A, 4B, 4C and 4D are illustrations of a pod and pylon of a wing aerial refueling system.

FIG. 7 is an illustration of a method of using a hose and drogue in a pod aboard a tanker aircraft to refuel a receiver aircraft.

DETAILED DESCRIPTION

Figure 4A:
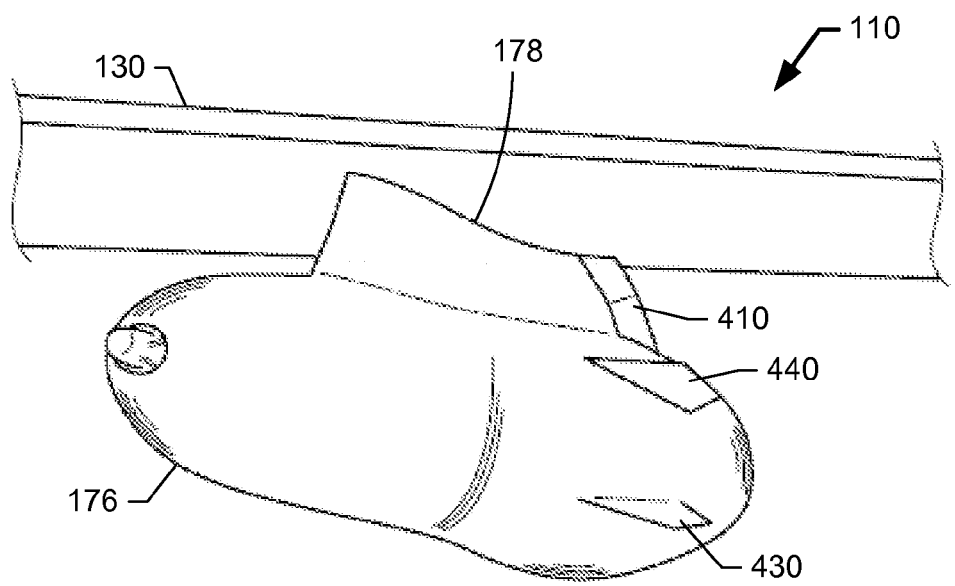

Reference is made to FIG. 1, which illustrates a tanker aircraft 110 including a fuselage 120, wing assemblies 130, and empennage 140. One or more propulsion units 150 are coupled to the fuselage 120, wing assemblies 130 or other portions of the tanker aircraft 110.

The tanker aircraft 110 includes one or more fuel tanks 160 for providing fuel to receiver aircraft during aerial refueling operations. The tanker aircraft 110 further includes at least one wing aerial refueling system 170. There may be one or more wing aerial refueling systems 170 per wing assembly 130. For instance, left and right wing aerial refueling systems 170 may be located at the extremes of left and right wing assemblies 130.

Reference is now made to FIG. 2. Each wing aerial refueling system 170 includes a hose 172 and drogue 174. The length of the hose 172 and design of the drogue 174 are tailored for the tanker aircraft's flight envelope. Each wing aerial refueling system 170 further includes a pod 176 for storing the hose 172 and drogue 174, and for deploying the hose 172 and drogue 174 during aerial refueling operations. The pod 176 may be attached to a lower outboard section of one of the wing assemblies 130 by a pylon 178, typically between 75% and 95% of wing semi-span.

Additional reference is made to FIG. 3, which illustrates a global (X-Y-Z) Cartesian coordinate system for the tanker aircraft 110. The X-axis extends in the direction from tail to nose of the fuselage 120 (the forward direction). The Y-axis may extend in the direction from middle of the fuselage 120 to a tip of the right wing (the "spanwise" direction). The Z-direction may be orthogonal to the X- and Y-directions (the up/down direction).

The arrow 310 represents freestream flow, which refers to the flow of air far upstream of the tanker aircraft 110 during flight. The arrow 320 represents local flow, which is the near field flow that is influenced by the tanker aircraft 110 during flight. The direction of the local flow 320 varies as the air moves past the wing assembly 130, pod 176 and pylon 178. The arrow 320 is angled a few degrees outboard to indicate that it is slightly perturbed relative to the freestream flow 310, and that the local flow 320 has a non-trivial component in the spanwise direction.

During flight, the spanwise component of the local flow 320 creates a pod vortex 330 trailing each pod 176 and pylon 178. Each pod vortex 330 will be referred to as a "pod"

vortex 330. The pod vortex 330 is circular in a vertical plane and has an upward velocity component (the flattened circle represents the circulation of the pod vortex 330). The applicants have found that strength and positioning of the pod vortex 330 are a function of local flow angle on the lower surface of the wing assembly 130 (defined by wing geometry, loading and flight condition), pod/pylon shaping, and flow separation, which create a side load on the pod 176 and the pylon 178.

The tanker aircraft 110 may be designed to fly at maximum operating speed or fly near maximum operating speed (e.g., cruise speed) by cambering and aligning (or toeing out) the pod 176 and the pylon 178 with respect to the local flow at buffet conditions so that local flow angle in the side plane (the X-Y plane) is near zero degrees. (The toe angle is the angle that the pod and pylon are rotated about the Z-axis, measured from the forward direction.) This alignment minimizes flow instabilities and buffeting at high-speed operation, as it creates a pressure distribution on the pylon and pod surfaces that varies in an orderly manner.

However, this alignment tends to create a higher local flow angle for the pod 176 and the pylon 178 at lower speeds (e.g., refueling speeds), thereby creating higher side force on the pod 176 and the pylon 178 (since the local flow direction is more outboard). As a result of the higher side force, a stronger pod vortex 330 is generated. The stronger pod vortex 330 can create instability for the hose 172 and the drogue 174 when extended from the pod 176 during refueling.

The drogue 174 stabilizes the hose 172 in flight and provides a funnel to aid insertion of a receiver aircraft's probe into a hose fuel coupling. After refueling has been completed, the hose 172 and the drogue 174 are retracted. The upward velocity component of the pod vortex 330 tends to cause instability for the hose 172 and the drogue 174 during retraction.

Reference is now made to FIGS. 4A, 4B, 4C and 4D, which illustrate a pod 176 and pylon 178 having a swept pylon flap 410 at an outboard side. The swept pylon flap 410 is configured to reduce loading on the pod 176 and the pylon 178 during all flight conditions of the tanker aircraft 110, and also to create a downward flow that counters the pod vortex 330 at lower speeds. The swept pylon flap 410 includes an uppermost portion 412 having a shallow incidence angle ($\alpha$) with respect to freestream flow 310 and a lowermost portion 414 having a higher incidence angle ($\alpha$). For the swept pylon flap 410, the terms "uppermost" and "lowermost" are relative to the wing assembly 130, with the uppermost portion 412 being closest to the wing assembly 130 and the lowermost portion 414 being furthest from the wing assembly 130 and closest to the pod 176. The uppermost portion 412 is swept in the aft direction to avoid flow separation. The uppermost portion 412 does not significantly affect the tanker aircraft 110 at higher operating speeds.

The uppermost portion 412 of the swept pylon flap 410 has an incidence angle ($\alpha$) between 0 and 30 degrees with respect to freestream flow 310. The lowermost portion 414 of the swept pylon flap 410 has an incidence angle ($\alpha$) between 30 and 90 degrees with respect to freestream flow 310. The position of the pod 176, as well as the sweep of the wing assembly 130, the lower surface contour of the wing assembly, and the freestream speed can all affect the ideal incidence angle ($\alpha$). The ideal incidence angle ($\alpha$) is one that turns the local flow efficiently without adversely affecting the surrounding air flow.

Figure 5:
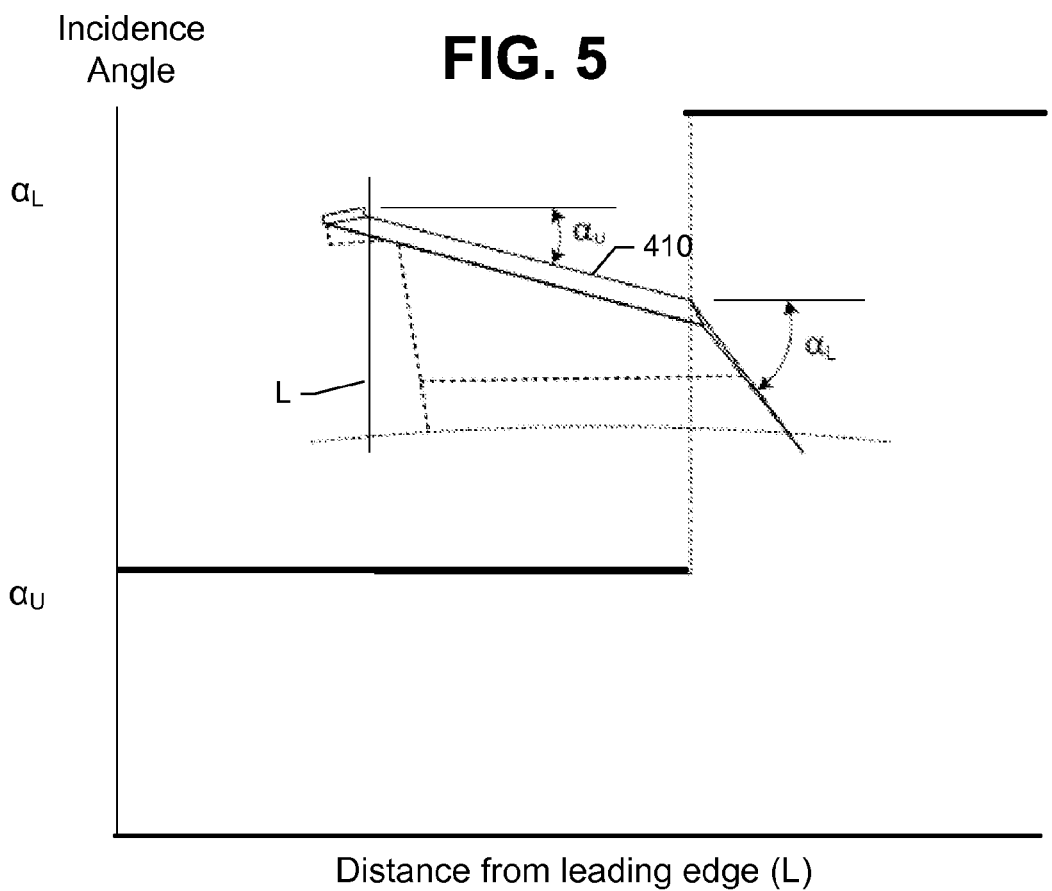
FIG. 5 is an illustration of a discontinuous incidence angle for a swept pylon flap.

In some embodiments, the increase in incidence angle ($\alpha$) is discontinuous in at least two discrete portions. FIG. 5 illustrates an example in which the pylon flap 410 has two discrete portions: a discrete uppermost portion 412 having an upper incidence angle ($\alpha_U$) between 0 and 30 degrees, and a discrete lowermost portion 414 having a lower incidence angle ($\alpha_L$) between 30 and 90 degrees. For each portion 412 and 414, the incidence angle ($\alpha_U$ and $\alpha_L$) is constant with respect to distance from a leading edge (L) of the swept pylon flap 410.

Figure 6:
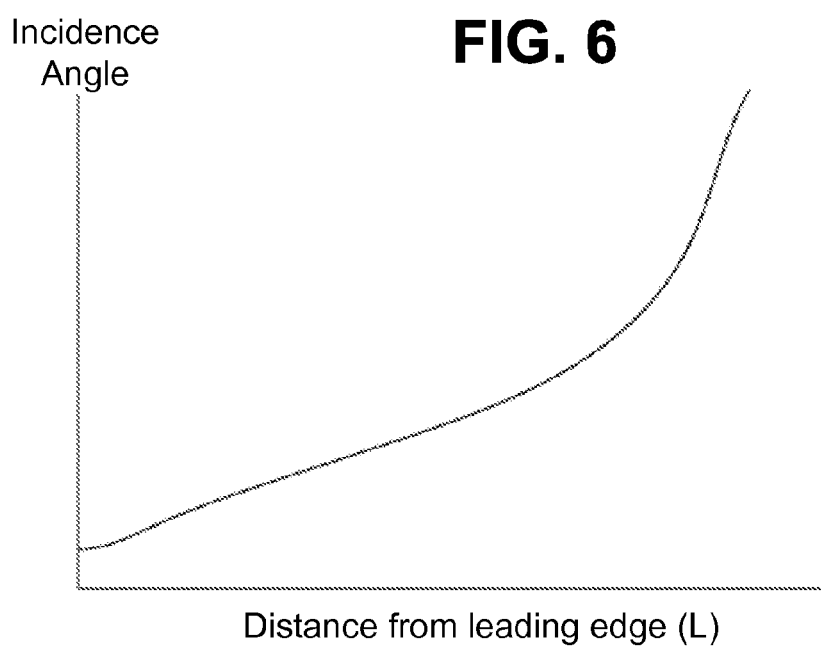
FIG. 6 is an illustration of a continuous incidence angle for a swept pylon flap.

In some embodiments, the incidence angle ($\alpha$) of the swept pylon flap 410 increases continuously from the uppermost portion 412 to the lowermost portion 414. FIG. 6 illustrates an example of a continuous non-linear increase with respect to the leading edge (L) of the swept pylon flap 410. In some embodiments, the increase may vary smoothly from the leading edge (L).

In addition to the pylon 178 having the swept pylon flap 410, the pod 176 may have at least one chine on its outer surface. A chine is a plate-like wing surface having a very low aspect (span-to-chord) ratio. See, for instance, the chine 420 illustrated in FIG. 4B. A chine is characterized by the vortex generated at its tip (outboard edge), and the strength of its vortex is determined by the chine design and orientation on the pod 176 (e.g., chine size, incidence, axial station, and azimuth angle).

A pair of chines may create a counter-rotating vortex pair. A vortex pair is characterized herein as counter-rotating if tip vortices in the pair rotate in opposite directions. The counter-rotating vortex pair interacts with the pod vortex 330 to disrupt (i.e., change the flow velocities and locations of) the pod vortex 330 and align the downward flow created by the swept pylon flap, without increasing total flow vorticity. The counter-rotating vortex pair maintains the alignment of the downward flow along the hose and drogue path at nominal and off-nominal flight conditions. As a result, the aligned downward flow pushes the hose and drogue downward, and the hose and drogue remain below a predominant region of vorticity trailing the pod and the pylon at refueling conditions. The chine(s) overcome problems with trail-rewind instabilities, which have been observed on legacy refueling platforms. The instabilities occur as the drogue gets closer to the pod.

Reference is once again made to FIG. 4B, which shows a pod 176 having three chines 420-440 on its outer surface: a lower inboard chine 420, a lower outboard chine 430, and an upper outboard chine 440. The lower inboard and lower outboard chines 420 and 430 are placed on opposite sides of the pod 176, and both have the same incidence angle or similar incidence angle (the incidence angle is measured relative to the local flow).

The upper outboard chine 440 creates a downward velocity adjacent to the swept pylon flap downward flow. It also creates multiple pairs of counter-rotating vortices with both of the lower chines 420 and 430. Incidence angles of the lower outboard and upper outboard chines 430 and 440 are in the opposite direction, which causes the tip vortices to rotate in opposite directions.

Figure 4B:
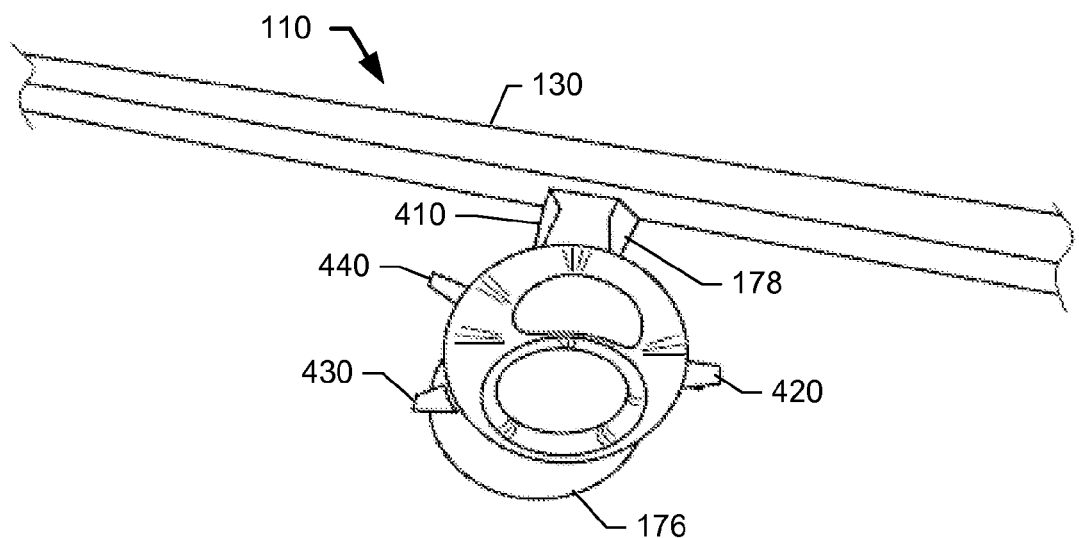

Although FIG. 4B illustrates three chines 420-440, other embodiments may have different chine configurations. As a first example, the pod 176 has only an upper outboard chine 440, which creates a counter-rotating vortex with the swept pylon flap 410. As a second example, the pod 176 has only the lower inboard and lower outboard chines 420 and 430, which create a single counter-rotating vortex pair. As a third example, the pod 176 has only the lower and upper outboard chines 430 and 440, which create a single counter-rotating vortex pair.

Reference is now made to FIG. 7, which illustrates a method of using a hose and drogue in a pod aboard a tanker aircraft to refuel a receiver aircraft. At block 710, the tanker aircraft is flying at or near its maximum operating speed. For example, the aircraft is flying near Mach 0.86. At this speed, the freestream flow is nearly aligned with the wing chord, and there is little to no outboard spanwise flow. This alignment of the pod and the pylon with the flow at buffet conditions minimizes flow instabilities and buffeting at the near-maximum operating speeds.

At block 720, speed of the aircraft is reduced to a refueling speed. For example, speed of the aircraft is reduced to Mach 0.6. At this speed, the local flow angle is increased by approximately three degrees.

At block 730, the swept pylon flap is used to reduce side load on the pod and pylon, thereby reducing the strength of the pod vortex. In addition, the swept pylon flap creates downward flow that counters the vertical velocity component of the pod vortex. In addition, or in the alternative, at least one chine pair is used to create a counter-rotating vortex pair.

At block 740, the hose and the drogue are extended. The downward flow from the swept pylon flap pushes the hose and drogue downward so that they remain below a predominant region of vorticity trailing the pod and the pylon at refueling speeds.

At block 750, the drogue stabilizes the hose in flight and provides a funnel to aid insertion of the receiver aircraft's probe into a hose fuel coupling. Fuel is then supplied to the receiver aircraft via the hose.

At block 760, after refueling has been completed, the drogue and hose are retracted and returned to the pod for storage. As the hose and drogue are being retracted, retraction forces cause the hose and drogue track to be higher, which can result in the drogue being entrained in the pod and pylon vortex. The swept pylon flap and the upper outboard chine direct the flow downward along the hose and drogue path and displace the upward velocities from the pod and pylon vortex away from the hose and drogue path. The counter-rotating vortices from the inboard and outboard lower chines keep the flow field centered on the hose and drogue path. This prevents the large upward velocities from the pod and pylon vortex from lifting the hose and drogue and entraining the drogue into a large circular orbit about the pod vortex.

A swept pylon flap herein is not limited to a single flap. In some embodiments, additional flaps may be used to provide the desired amount and location of the downward flow.

In some embodiments, the swept pylon flap may be split into two or more portions. Incidence angles of the portions may be controlled passively or actively. This split design enables the swept pylon flap component to be aligned with the freestream flow to minimize effects on aircraft performance when not in use for refueling.

The swept flap is not limited to the pylon. Other support structures on the tanker aircraft may have the swept flap.

A tanker aircraft herein is not limited to a single wing aerial refueling system. A tanker herein may include at least one additional wing aerial refueling system for multipoint refueling.

An aircraft herein is not limited to a tanker aircraft. The swept flap and/or chines may be applied to an aircraft having a pod or store, where the flow field of interest trails the pod or store. Examples include pods and stores for towed decoys and electronic countermeasure equipment.

The invention claimed is:

1. An aircraft comprising:
a wing assembly;
a pod having a hose and a drogue; and
a pylon attaching the pod to the wing assembly, the pylon having a swept pylon flap extending from the pylon, the swept pylon flap having a first portion extending from the pylon toward an aft direction at a first incidence angle from a leading edge of the swept pylon flap, and a second portion extending from an end of the first portion toward the aft direction at a second incidence angle different than the first incidence angle, the swept pylon flap to reduce loading on the pylon and the pod during flight of the aircraft, the swept pylon flap to create a downward flow to counter a vortex trailing the pod.

2. The aircraft of claim 1, wherein the pod and the pylon are aligned with local flow at buffet conditions.

3. The aircraft of claim 1, wherein the first incidence angle is a shallow incidence angle with respect to freestream flow, the first incidence angle increasing towards the second portion.

4. The aircraft of claim 1, wherein the first incidence angle is between 0 and 30 degrees with respect to freestream flow.

5. The aircraft of claim 1, wherein the second incidence angle is between 30 and 90 degrees with respect to freestream flow.

6. The aircraft of claim 1, wherein the first incidence angle increases continuously from the first portion to the second portion.

7. The aircraft of claim 1, wherein at least one of the first incidence angle or the second incidence angle increases discontinuously relative to the leading edge of the pylon swept flap.

8. The aircraft of claim 1, further comprising at least a first chine and a second chine on an outer surface of the pod to disrupt the vortex and to align the downward flow created by the swept pylon flap.

9. The aircraft of claim 8, wherein the first and second chines are configured to create a counter-rotating vortex pair.

10. The aircraft of claim 9, wherein the first and second chines are upper and lower outboard chines.

11. The aircraft of claim 9, wherein the first and second chines are lower inboard and lower outboard chines.

12. The aircraft of claim 8, further including a third chine on the outer surface of the pod, wherein first, second and third chines are configured to create multiple counter-rotating vortex pairs.

13. The aircraft of claim 1, further including a lower outboard chine positioned on an outer surface of the pod, wherein the lower outboard chine and the swept pylon flap provide a counter-rotating pair.

14. The aircraft of claim 1, further comprising at least one additional pod and pylon for multipoint refueling, wherein each additional pylon has a respective swept pylon flap.

15. An aircraft of claim 1, wherein the pylon extends from the pod, and wherein the first portion of the swept pylon flap is adjacent the wing assembly of the aircraft and is swept in the aft direction to avoid flow separation.

16. The aircraft of claim 1, further comprising an outboard upper chine on the pod to create a vortex that is to counter-rotate with respect to the downward flow from the swept pylon flap.

17. The aircraft of claim 1, further including first and second chines on an outer surface of the pod to create a counter-rotating vortex pair.

18. The aircraft of claim 1, wherein at least a portion of the first portion of the swept pylon flap has an elevation that is greater than an elevation of a least a portion of the second portion.

19. The aircraft of claim 1, wherein the first portion has a slope directed toward the aft direction and the pod.

20. The aircraft of claim 1, wherein the first portion extends in the aft direction relative to a trailing edge of the pylon and away from the wing assembly.

21. The aircraft of claim 1, wherein the swept pylon flap extends in a rearward direction from a trailing edge of the pylon.

22. The aircraft of claim 1, wherein the swept pylon flap is to apply a downward force to at least one of the those or the drogue when the hose and the drogue extend relative to the pod.

23. An aircraft comprising:
a wing assembly;
a pod having a hose and a drogue; and
a pylon attaching the pod to the wing assembly, the pylon having a swept pylon flap extending from the pylon in an aft direction, the swept pylon flap having a first portion extending from a trailing edge of the pylon at a first rearward angel and a second portion extending from an end of the first portion at a second rearward angle different than the first rearward angle.

24. The aircraft of claim 23, wherein the swept pylon flap is to reduce loading on the pylon and the pod during flight of the aircraft and the swept pylon flap is to create downward flow to counter a vortex trailing the pod.

25. The aircraft of claim 23, wherein the first rearward angle is between approximately 0 degrees and 30 degrees.

26. The aircraft of claim 23, wherein the second rearward angle is between approximately 30 degrees and 90 degrees.

* * * * *

UNITED STATES PATENT AND TRADEMARK OFFICE
CERTIFICATE OF CORRECTION

PATENT NO. : 9,533,754 B2  
APPLICATION NO. : 14/256935  
DATED : January 3, 2017  
INVENTOR(S) : Stanley D. Ferguson, Ian J. Fialho and Richard C. Potter Page 1 of 1

It is certified that error appears in the above-identified patent and that said Letters Patent is hereby corrected as shown below:

In the Claims

Column 7, Line 17 (Claim 22): replace "those" with "hose"

Signed and Sealed this  
Eleventh Day of April, 2017

Michelle K. Lee  
*Director of the United States Patent and Trademark Office*